United States Patent
Soja et al.

(10) Patent No.: US 7,447,867 B2
(45) Date of Patent: Nov. 4, 2008

(54) NON-INTRUSIVE ADDRESS MAPPING HAVING A MODIFIED ADDRESS SPACE IDENTIFIER AND CIRCUITRY THEREFOR

(75) Inventors: Richard Soja, Austin, TX (US); William C. Moyer, Dripping Springs, TX (US); Ray C. Marshall, Abbots Langley (GB)

(73) Assignee: Freescale Semiconductor, Inc., Austin, TX (US)

( * ) Notice: Subject to any disclaimer, the term of this patent is extended or adjusted under 35 U.S.C. 154(b) by 447 days.

(21) Appl. No.: 11/413,430

(22) Filed: Apr. 28, 2006

(65) Prior Publication Data

US 2007/0198805 A1 Aug. 23, 2007

(51) Int. Cl.
G06F 12/00 (2006.01)
(52) U.S. Cl. ..................... 711/202; 712/226
(58) Field of Classification Search ............... 711/202
See application file for complete search history.

(56) References Cited

U.S. PATENT DOCUMENTS

| | | | |
|---|---|---|---|
| 4,488,228 A | 12/1984 | Crudele et al. |
| 4,493,035 A | 1/1985 | MacGregor et al. |
| 4,524,415 A | 6/1985 | Mills, Jr. et al. |
| 4,635,193 A | 1/1987 | Moyer et al. |
| 4,763,244 A | 8/1988 | Moyer et al. |
| 4,763,250 A | 8/1988 | Keshlear et al. |
| 4,800,489 A | 1/1989 | Moyer et al. |
| 4,862,352 A | 8/1989 | Moyer et al. |
| 4,888,688 A | 12/1989 | Hartvigsen et al. |
| 4,890,223 A | 12/1989 | Cruess et al. |
| 5,029,072 A | 7/1991 | Moyer et al. |
| 5,239,642 A | 8/1993 | Gutierrez et al. |
| 5,319,763 A | 6/1994 | Ho et al. |
| 5,341,500 A | 8/1994 | Moyer et al. |
| 5,375,216 A | 12/1994 | Moyer et al. |
| 5,388,226 A | 2/1995 | Gutierrez et al. |
| 5,535,351 A | 7/1996 | Peng |
| 5,666,509 A | 9/1997 | McCarthy et al. |
| 5,732,405 A | 3/1998 | Ho et al. |
| 6,154,826 A | 11/2000 | Wulf et al. |
| 6,185,657 B1 | 2/2001 | Moyer |
| 6,519,684 B1 | 2/2003 | Moyer |
| 6,523,104 B2 | 2/2003 | Kissell |
| 6,643,759 B2 | 11/2003 | Andersson et al. |
| 6,651,156 B1 | 11/2003 | Courtright et al. |

(Continued)

Primary Examiner—Kevin L Ellis
Assistant Examiner—Hashem Farrokh
(74) Attorney, Agent, or Firm—Robert L. King; Joanna G. Chiu

(57) ABSTRACT

A method includes providing an effective address, providing an address space identifier which identifies a currently executing process, providing a mapping modifier to form a modified address space identifier where the mapping modifier is based on at least one external signal generated outside the processor, using the effective address and the modified address space identifier to form a logical address, and providing a physical address corresponding to the logical address. When the effective address has a first effective address value, the address space identifier has a first address space identifier value, and the mapping modifier has a first mapping value, the physical address has a first physical address value. When the effective address has the first effective address value, the address space identifier has the first address space identifier value, and the mapping modifier has a second mapping value, the physical address has a second physical address value.

20 Claims, 3 Drawing Sheets

U.S. PATENT DOCUMENTS

| | | |
|---|---|---|
| 6,725,289 B1 | 4/2004 | Waldspurger et al. |
| 6,728,859 B1 | 4/2004 | Kissell |
| 6,748,558 B1 | 6/2004 | Gonzales et al. |
| 6,766,431 B1 | 7/2004 | Moyer |
| 6,859,875 B1 | 2/2005 | Moyer et al. |
| 6,925,542 B2 | 8/2005 | Moyer et al. |
| 6,963,963 B2 | 11/2005 | Moyer |
| 7,024,536 B2 | 4/2006 | Park et al. |
| 2002/0144077 A1 | 10/2002 | Andersson et al. |
| 2003/0014609 A1 | 1/2003 | Kissell |
| 2003/0182532 A1 | 9/2003 | Park et al. |
| 2004/0186973 A1 | 9/2004 | Moyer et al. |
| 2004/0193831 A1 | 9/2004 | Moyer |
| 2005/0038973 A1 | 2/2005 | Ito et al. |
| 2005/0125623 A1 | 6/2005 | Dale et al. |

NON-INTRUSIVE ADDRESS MAPPING HAVING A MODIFIED ADDRESS SPACE IDENTIFIER AND CIRCUITRY THEREFOR

RELATED APPLICATIONS

The present invention relates to the following co-pending applications: (1) "Data Processing System Having Address Translation Bypass And Method Therefor" which was filed by William C. Moyer et at. on Feb. 23, 2006 and has a Ser. No. 11/360,926 and assigned to the same assignee as the present application; and (2) "Processor and Method for Altering Address Translation" filed of even date herewith by William C. Moyer et at., U.S. Ser. No. 11/413,422 and assigned to the assignee of the present application.

FIELD OF THE INVENTION

The present invention relates generally to data processors, and more particularly to address translation performed by data processors.

BACKGROUND OF THE INVENTION

Data processing systems frequency include a variety of types of memories, some of which may have different timing specifications. If the data processing system is used in a real-time application system, it may be useful during development to temporarily overlay small blocks of readily programmed memory, such as SRAM (Static Random Access Memory) over a portion of more difficult to program memory such as flash EEPROM (electrically erasable programmable read only memory) or ROM (read only memory) in order to allow the values obtained form the memory to be temporarily changed more readily. Additionally, in control systems a calibration process is commonly implemented prior to final production in which there is a remapping of pages of memory that contain different control parameters for purposes of fine tuning final production control parameters. For example, to fine tune or calibrate the behavior of an application, a set of program constant that application code is accessing may have to be modified by a user using an external tool connected to the processing system. The set of program constants must be made available coherently to the application code, and usually at some specific location in the execution of the code.

For development purposes address translation information is therefore required to be altered for one or more pages of memory by an external agent, such as a software or hardware development tool. Because a memory management unit (MMU) in a processing system can only be manipulated by an associated processor, the altering of address translation information may require the halting of the processor's execution to permit address translation alteration by a debug or scan port. Alternatively, the processor may be interrupted to permit software to remap the addressing. The remapping of memory is typically an intrusive operation that negatively effects system operation.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Figure 1:
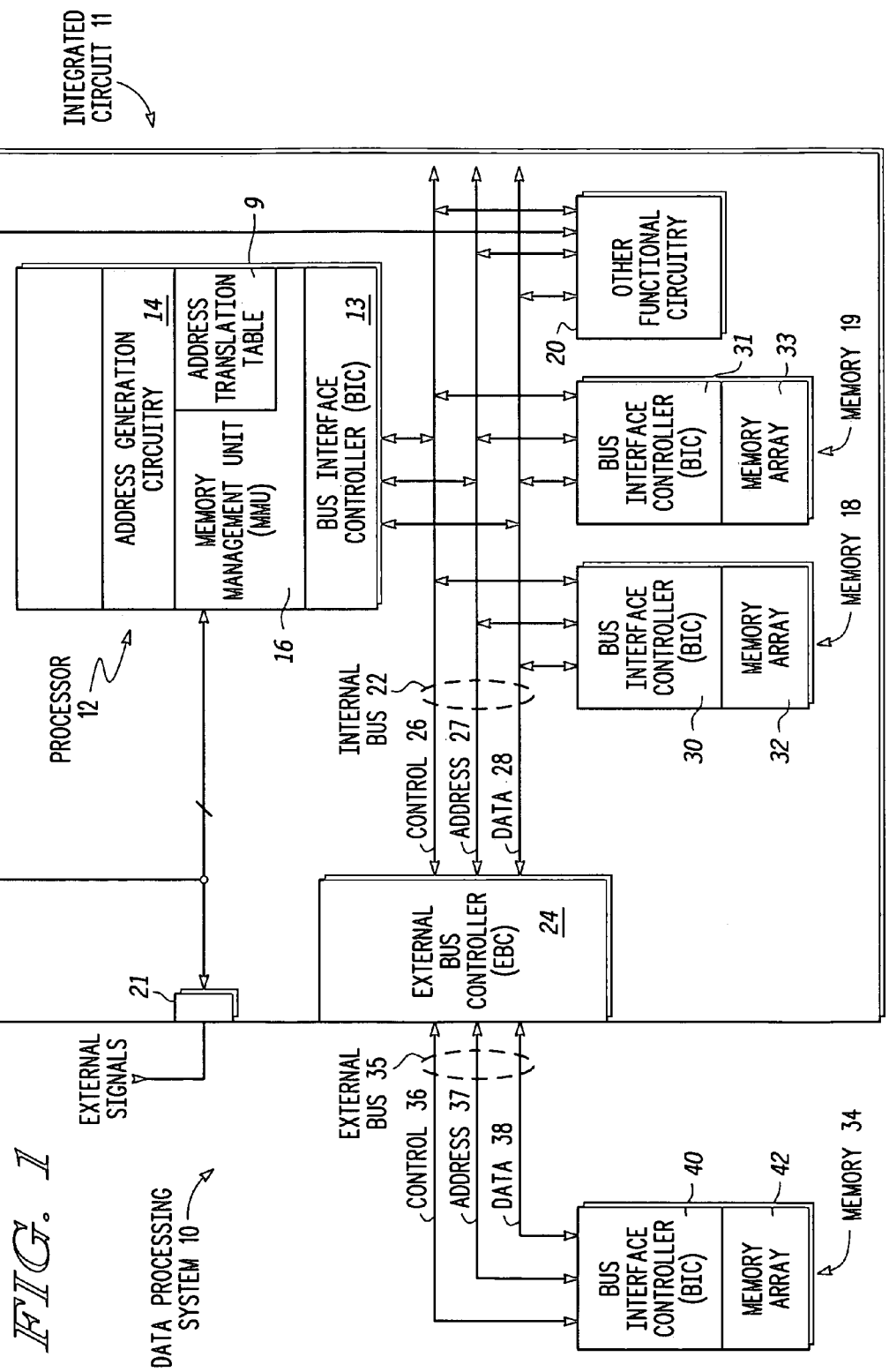
FIG. 1 illustrates a block diagram of a data processing system in accordance with one embodiment of the present invention.

Referring to FIG. 1, in one embodiment, a data processing system 10 includes an integrated circuit 11 having a processor 12, a memory 18, a memory 19, other functional circuitry 20, and external bus controller (EBC) 24 which are bi-directionally coupled by way of an internal bus 22. The internal bus 22 includes control signals 26, address signals 27, and data signals 28. The processor 12 includes a bus interface controller (BIC) 13 which bi-directionally couples the processor 12 to control signals 26, address signals 27, and data signals 28. The memory 18 includes a memory array 32 and a bus interface controller (BIC) 30. The BIC 30 bi-directionally couples the memory 18 to control signals 26, address signals 27, and data signals 28. Memory 19 includes a memory array 33 and a bus interface controller (BIC) 31. BIC 31 bi-directionally couples the memory 19 to control signals 26, address signals 27, and data signals 28. Other functional circuitry 20 is bi-directionally coupled to control signals 26, address signals 27, and data signals 28. An external bus controller (EBC) 24 is bi-directionally coupled to control signals 26, address signals 27, and data signals 28. Note that in different embodiments of the present invention, processor 12, memory 18, memory 19, other functional circuitry 20, and EBC 24 may be coupled to any desired portions of the internal bus 22 which allow these blocks to perform their respective functions. Thus in some embodiments, not all of the elements associated with reference numbers 12, 18-20, and 24 need be coupled to all of the signals of the internal bus 22. Note also that for some embodiments of the present invention, at least a portion of control signals 26 and 36 may be used to transfer status information. External signals are supplied to an integrated circuit pin 21 of the integrated circuit 11. A conductive bus is connected between the integrated circuit pin 21 and an input of the memory management unit 16. Also, a bidirectional bus is connected between the integrated circuit pin 21 and an input/output terminal of the other functional circuitry 20.

The processor 12 includes address generation circuitry 14. Some embodiments of the processor 12 may include a memory management unit 16. The memory management unit 16 may include address translation table 9. However, the memory management unit 16 and address translation table 9 may be located anywhere appropriate in data processing system 10. Other functional circuitry 20 may perform any desired function. Some examples of functions which may be performed by other functional circuitry 20 are timers, an input/output port, a communications port (e.g. a serial communications port, a serial peripheral interface, etc.), drivers (e.g. Liquid Crystal Display drivers), an analog-to-digital (A/D) converter, a digital-to-analog (D/A) converter, additional memory, a Direct Memory Access (DMA) device, or any other desired function.

The external bus controller (EBC) 24 is used to bi-directionally couple the internal bus 22 and the external bus 35. The integrated circuit 11 is bi-directionally coupled to the memory 34 by way of an external bus 35. The external bus 35 includes control signals 36, address signals 37, and data signal 38. The memory 34 includes a memory array 42 and a bus interface controller (BIC) 40. The BIC 40 bi-directionally couples the memory 34 to the control signals 36, the address signals 37 and the data signals 38. In alternate embodiments, the memory 34 and the integrated circuit 11 are implemented on different integrated circuits. In yet other embodiments, various portions of the data processing system 10 are implemented on different integrated circuits or the same integrated circuit.

Although the data processing system 10 has been illustrated as having memories 18, 19, and 34, alternate embodiments may have any desired number of memories implemented on the integrated circuit 11 (e.g. memories 18 and 19) and any desired number of memories implemented external to the integrated circuit 11 (e.g. memory 34). In addition, the memory 18, the memory 19 and the memory 34 may be any type of memory: including, but not limited to static random access memory (SRAM), dynamic random access memory (DRAM), read only memory (ROM), erasable programmable read only memory (EPROM), electrically erasable programmable read only memory (EEPROM), magnetic random access memory (MRAM), etc. Note that memories 18, 19, and 34 may be the same, or different, types of memories.

Figure 2:
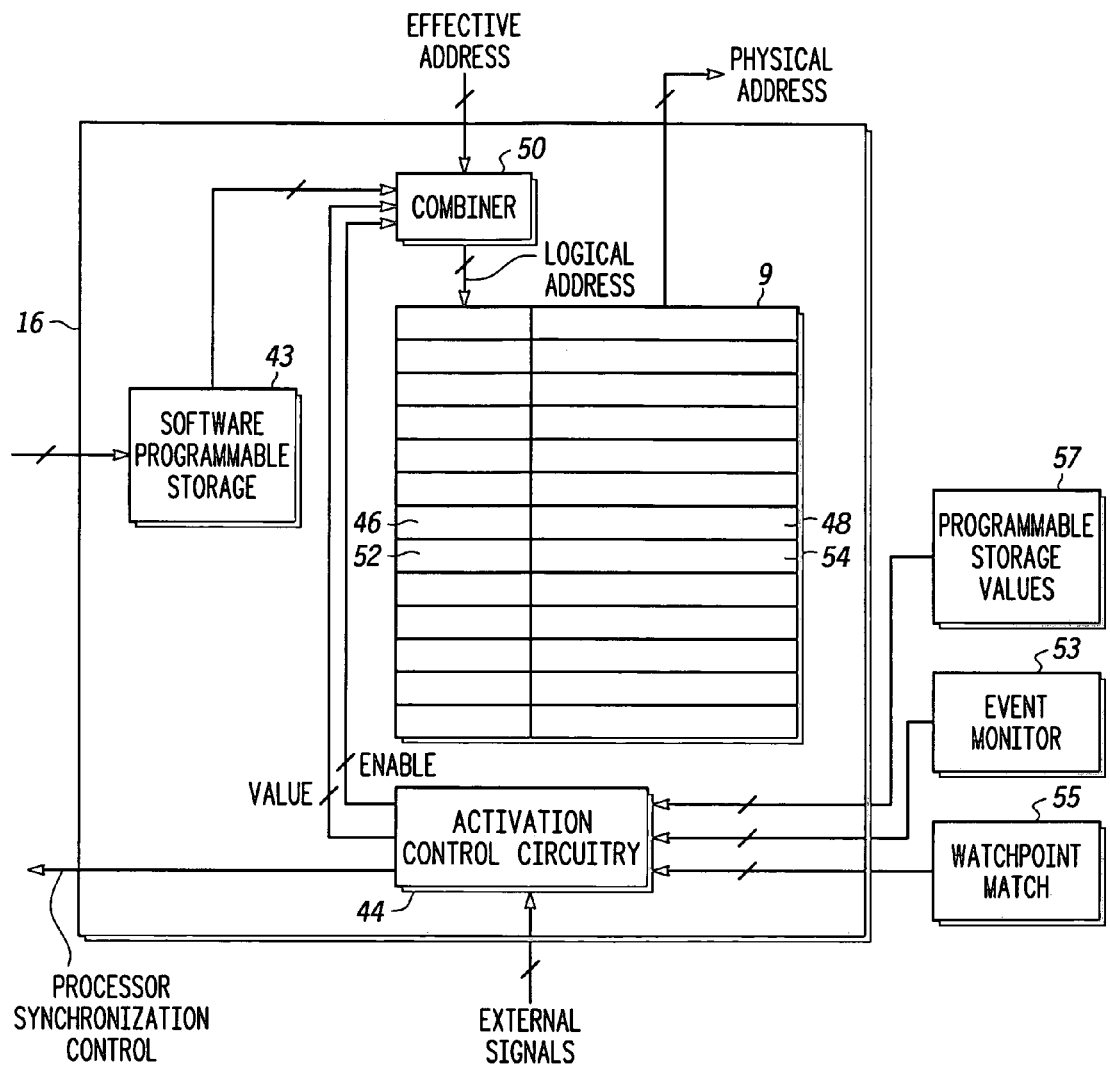
FIG. 2 illustrates a block diagram of one form of the memory management unit (MMU) of FIG. 1.

Illustrated in FIG. 2 is further detail of an embodiment of the memory management unit 16 and address translation table of FIG. 1 with additional detail of data processing system 10. The address translation table 9 is illustrated having an input for receiving a logical address and an output for providing a physical address. In one form the address translation table 9 is implemented as a translation lookaside buffer (TLB) and is implemented as a conventional content addressable memory (CAM). A software programmable storage device 43 has an input for receiving one or more control signals from a portion of the processor 12 of FIG. 1. In one form the software programmable storage device 43 is a register. An output of the software programmable storage device 43 is connected to a first input of a combiner circuit 50 for providing a logical address. Combiner circuit 50 has a second input for receiving an effective address. In one embodiment, the effective address is supplied by the address generation circuitry 14 of FIG. 1. In alternate embodiments, an effective address may be provided from circuitry in the data processing system 10 which is external to the processor 12 as one of the address signals 27. Such circuitry may by example be the other functional circuitry 20 of FIG. 1 or other circuitry located elsewhere in the data processing system 10.

An output of the combiner circuit 50 is connected to the address translation table 9 where the logical address provided by combiner circuit 50 is compared by conventional comparator circuitry (not shown) of the address entries stored in address translation table 9. Activation control circuitry 44 has a first input for receiving external signals coupled via input pin 21 of the integrated circuit 11. Activation control circuitry has a second input for receiving programmable storage values 57 that are stored in a register file or other storage device. Activation control circuitry 44 has a third input for receiving event inputs from an event monitor 53. Activation control circuitry 44 has a fourth input for watchpoint match signals from watchpoint match circuitry 55. The programmable storage values 57, event monitor 53 and watchpoint match circuitry 55 are implemented either within processor 12 or within the other functional circuitry 20 of data processing system 10. In one form the activation control circuitry 44 has a first output for providing a processor synchronization control signal. A second output of activation control circuitry 44 is connected to a third input of combiner circuit 50, and a third output of activation control circuitry 44 is connected to a fourth input of combiner circuit 50. In some embodiments the processor synchronization control signal may not be present. In other embodiments multiple synchronization control signals may be provided for synchronization of other elements within the data processing system 10. Within address translation table 9 is an address entry having a tag 46 and a physical address 48. Another address entry of address translation table 9 is illustrated having a tag 52 and a physical address 54.

In operation, an effective address is received, converted to a logical address and then a corresponding translated physical address is provided at an output of the address translation table 9. One or more external signals received via one or a set of external control pins is received by the activation control circuitry 44. In response to the Enable signal from the activation control circuitry 44, the combiner circuit 50 functions to combine in some way three pieces of information. A software value from the software programmable storage device 43 is combined with the output of the activation control circuitry 44 and the effective address. In one embodiment the combination is implemented by concatenating the three pieces of information. Other forms of combination may be implemented. The software programmable storage device 43 receives a value in response to instruction execution by processor 12. As will be described below, in one embodiment, the software programmable value forms a portion or all of an address space identifier (ASID) which is compared with appropriate portions of all of the tags of the address translation table 9. An ASID functions generally to identify a unique physical address that is to be selected such that the same effective addresses can be used for different processes.

A portion of the activation control circuitry 44 is hardware circuitry that also provides a portion of the address space identifier. External signals are received by the activation control circuitry 44 that supply actual information values to be used as a portion of the address space identifier. These external signals are values generated by various external sources such as an external hardware or software debug tool or from external hardware logic (not shown). In some embodiments the activation control circuitry 44 may derive the values to be used as a portion of the address space identifier from the external signals instead of being supplied with the actual information values. In one embodiment, activation control circuitry 44 may include a debug port and debug control logic. In one embodiment, a JTAG (Joint Test Action Group) TAP (Test Access Port) interface or NEXUS (the widely used IEEE standard for debug of processor and digital system architectures) debug port may be included which implements a debug control function.

The activation control circuitry 44 receives the values and generates both the Enable signal and a Value signal. In general, the Enable signal is triggered by the occurrence of a triggering mechanism. For example, an event may be generated by an event monitor 53 or the watchpoint match circuitry 55. The watchpoint match circuitry 55 and event monitor 53 function to generate alternative ways to create the enable signal provided by the activation control circuitry 44 in response to a predetermined event occurring or when a predetermined address in instruction execution occurs. The predetermined event may be one of numerous types of events or can be triggered by the external signals. For example, a signal from an external tool (not shown) is one type of event. Another example is a signal from an external ASIC (application specific integrated circuit). Additionally, programmable storage values 57 provide other alternatives of external sources of inputs for a value that can be used by the activation control circuitry 44. A NEXUS debug port (not shown) may be used to provide values for the programmable storage values 57. It should be apparent that there is provided a variety of mechanisms for controlling activation control circuitry 44 such as memory-mapped registers which can be altered by a direct memory access controller in the other functional circuitry 20, any real-time system event, a breakpoint address match, a watchpoint match and other monitored functions.

The activation control circuitry 44 also provides a processor synchronization control signal in response to receiving an input signal, regardless of which source of origin discussed above. The synchronization control is active generally when the enable signal is active. The processor synchronization control signal is used for guaranteeing correct memory accessibility of any of memory 18, memory 19 or memory 34. In other words, the access is coordinated to ensure that all memory accesses in progress are completed before any new memory address space is selected. Additional instruction synchronization of the processor may be applied to flush instruction prefetch buffers if implemented. In some embodiments, additional synchronization operations involving other logic within data processing system 10 may be provided by activation control circuitry 44.

Figure 3:
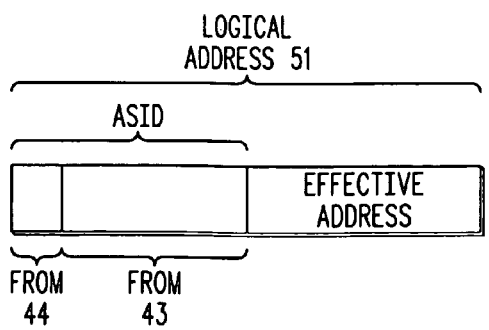
FIG. 3 illustrates in diagrammatic form a format of a logical address used by the MMU of FIG. 2.

The combiner circuit 50 functions to form logical addresses for the address translation table 9. In particular, see FIG. 3 wherein an exemplary format of the logical address is illustrated. The combiner circuit 50, in one form, concatenates a field of one or more VALUE bits received from the activation control circuitry 44 with a field of one or more bits received from the software programmable storage device 43. It should also be noted that either of these fields may be totally replaced by the other field and not be present. In such an embodiment, that field would contain no bits and be absent. When both fields are used or only one field is used, the concatenated combination forms the Address Space Identifier. It should be noted that the logical address also includes a concatenation of the effective address that is received by combiner circuit 50 from the address generation circuitry 14. The concatenation of the received fields by combiner circuit 50 forms a logical address 51 as illustrated in FIG. 3.

Figure 4:
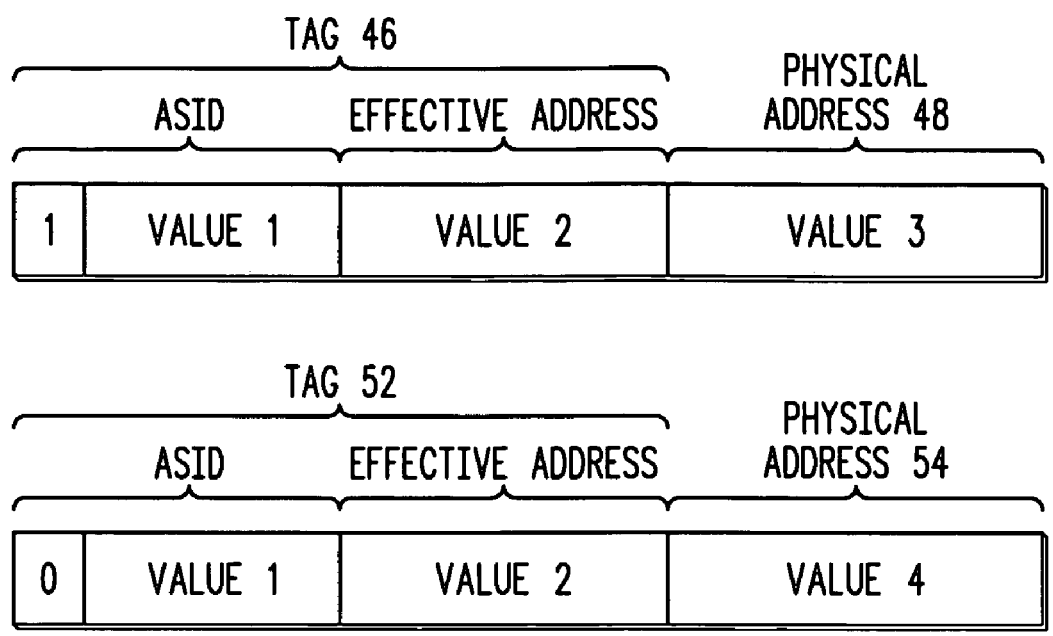
FIG. 4 illustrates in diagrammatic form a format of two address entries contained in the address translation table in accordance with one form of the present invention.

Illustrated in FIG. 4 is an example of two address translation table entries stored in the address translation table 9. A first address translation table entry contains a tag 46 and a physical address 48. A second address translation table entry contains a tag 52 and a physical address 54. The tags 46 and 52 each include a stored ASID and a stored effective address that is matched with the logical address from the combiner circuit 50. As described above in connection with FIG. 3, the logical address includes a modified ASID from the combiner circuit 50 and the effective address received by combiner circuit 50.

The activation control circuitry 44 provides an Enable signal to combiner 50 in response to detecting a predetermined condition from any or a combination of the external signal(s), the programmable storage values 57, the event monitor 53 or the watchpoint match 55. When the Enable signal is not active, the ASID is provided by the software programmable storage device 43 and is not modified in any way by combiner circuit 50. When the Enable signal is active, the ASID is provided by the software programmable storage device 43 and is "modified". In one form the modification to the ASID is implemented by using the Value signal provided by the activation control circuitry 44. In another form the modification to the ASID is implemented by using a modified value that is derived from the Value signal.

The stored ASID of tag 46 has a modified portion as indicated by the left-most field assuming a binary "one". A remaining portion or subset of the ASID of tag 46 has a value field that is holding a first value labeled "value 1". It should be well understood that the modified portion of the ASID may be implemented by any number of bits and the modified portion is not required to be a single bit field. The stored effective address of tag 46 has a second value labeled "Value 2". Similarly, the stored ASID of tag 52 has a portion or field represented by a binary "zero" that differs from the modified portion of the ASID of tag 46. A remaining portion of the ASID of tag 52 has a value field holding the same first value, "value 1", as the corresponding portion of the stored ASID of tag 46. The tag 52 also has another field for holding an effective address having the same second value as the stored effective address of tag 46. It should thus be noted that the same values in the effective address fields of these two entries point to two different physical address fields. The differentiator between the two entries is the modified portion of the stored ASID of the tag.

It should also be understood that the modified portion of the ASID may be all of the ASID rather than a subset or partial amount of the ASID. As a result, the amount of one ASID that has a same value as another ASID may vary from implementation to implementation and not necessarily be the same width as illustrated in FIG. 4.

By now it should be understood that there has been provided a set of one or more externally supplied hardware input signals to perform dynamic alteration of memory address mapping within a memory management unit. The external signals are utilized to effect an alteration of the logical-to-physical mapping without stalling, halting or interrupting the execution stream of the processor. A portion of the logical address used in translation lookaside buffer lookups is controlled by an externally accessible integrated circuit input, such as an IC terminal. An address map alteration is implemented by changing the value of a portion of a logical address specifier, the ASID, via hardware input signals. The address map alteration is independent of core operation and is nonintrusive to the operation of the core. The address mapping described herein is a real-time update of the address.

In one form there has been provided a method for translating a logical address into a physical address in a processor having an address translation table. An effective address is provided. An address space identifier which identifies a currently executing process is provided, the address space identifier being provided by a storage location programmable by software executing on the processor. A first value is provided to modify at least a portion of the address space identifier, the first value being based on at least one external signal generated outside the processor. The effective address and the modified address space identifier are used to form a logical address. The logical address is matched to an entry of the address translation table to provide a physical address corresponding to the logical address. In one form when the effective address has a first effective address value and the provided address space identifier has a first address space identifier value, the provided physical address has a first physical address value. In another form a second value is provided to modify the at least a portion of the address space identifier, the second value being based on external signals generated outside the processor. When the effective address has the first effective address value and the provided address space identifier has the first address space identifier value, the provided physical address has a second physical address value, different from the first physical address value. In another form the first value is provided to modify the at least a portion of the address space identifier in response to a program counter matching a predetermined value. In yet another form the first value is provided to modify the at least a portion of the address space identifier in response to receiving a signal from an external tool. In yet another form the first value is provided to modify the at least a portion of the address space identifier in response to a predetermined real-time system event. In one form the first value is provided to modify the at least a portion of the address space identifier by modifying all of the address space identifier using the first value. In yet another form the first value is received via a terminal of an integrated circuit including the processor. In another form the modified address space identifier is concatenated with the effective address to form the logical address.

In yet another form there is provided a method for translating logical addresses into physical addresses in a processor having an address translation table. An effective address is provided. An address space identifier which identifies a currently executing process is provided. The address space identifier is provided by a storage location programmable by software executing on the processor. A mapping modifier is provided to modify at least a portion of the address space identifier to form a modified address space identifier. The mapping modifier is based on at least one external signal generated outside the processor. The effective address and the modified address space identifier are used to form a logical address. The logical address is matched to an entry of the address translation table to provide a physical address corresponding to the logical address. When the effective address has a first effective address value, the address space identifier has a first address space identifier value, and when the mapping modifier has a first mapping value, the physical address has a first physical address value. When the effective address has the first effective address value, the address space identifier has the first address space identifier value, and the mapping modifier has a second mapping value, the physical address has a second physical address value, different from the first physical address value. In one form the mapping modifier is provided to modify the at least a portion of the address space identifier in response to a program counter of the processor matching a predetermined value. In another form the mapping modifier is provided to modify the at least a portion of the address space identifier in response to receiving a signal from an external tool. In yet another form the mapping modifier is provided to modify the at least a portion of the address space identifier in response to a predetermined real-time system event. In another form a processor synchronization control signal is provided to synchronize a pipeline of the processor when the mapping modifier is used to modify the address spaced identifier. In another form the mapping modifier is received via a terminal of an integrated circuit including the processor. In another form the effective address and the modified address space identifier are used to form the logical address by concatenating the modified address space identifier with the effective address to form the logical address.

In yet another form there is provided a processor having an address translation table for translating logical addresses into physical addresses. Storage circuitry is programmable by software executed by the processor. The storage circuitry stores an address space identifier which identifies a currently executing process. Control circuitry is coupled to the storage circuitry and the address translation table and is coupled to receive an effective address and at least one external signal generated outside the processor. The activation control circuitry modifies the address space identifier using at least one external signal to produce a modified address space identifier and provides a logical address formed using the modified address space identifier and the effective address to the address translation table. In one form the address translation table has a first entry having a first tag value based on a first effective address value, a first address space identifier value, and a first value of the at least one external signal. The first tag value corresponds to a first physical address value. A second entry has a second tag value based on the first effective address value, the first address space identifier value, and a second value of the at least one external signal. The second tag value corresponds to a second logical address value, different from the first physical address value. In one form the control circuitry includes activation control circuitry coupled to receive the at least one external signal and provides a mapping modifier based on the at least one external signal. Combiner circuitry is coupled to the activation control circuitry, the combiner circuitry modifying the address space identifier using the mapping modifier to produce a modified address space identifier and providing the logical address formed using the modified address space identifier and the effective address to the address translation table. In one form the control circuitry modifies the address space identifier in response to at least one trigger selected from a group consisting of: (1) a program counter of the processor matching a predetermined address value; (2) a predetermined real-time system event; and (3) receiving a signal from a tool external to the processor.

In the foregoing specification, the invention has been described with reference to specific embodiments. However, one of ordinary skill in the art appreciates that various modifications and changes can be made without departing from the scope of the present invention as set forth in the claims below. For example various types of processors and integrated circuit functions may be implemented. The external signals may be analog or digital. If analog in nature, a conversion to a digital equivalent would be implemented. Various bus timing and bus protocols may be used. The combiner circuit may be implemented to perform a concatenation function, an add/subtract function or other combinational functions, including logic functions. The address translation table 9 may be implemented with any of a variety of conventional data storage circuits and associated compare circuitry and logic. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. A method for translating a logical address into a physical address in a processor having an address translation table, comprising:
    providing an effective address;
    providing an address space identifier which identifies a currently executing process, the address space identifier provided by a storage location programmable by software executing on the processor;
    providing a first value to modify at least a portion of the address space identifier to create a modified address space identifier, the first value based on at least one external signal generated outside the processor;
    using the effective address and the modified address space identifier to form a logical address; and
    matching the logical address to an entry of the address translation table to provide a physical address corresponding to the logical address.

2. The method of claim 1, wherein when the effective address has a first effective address value and the address space identifier has a first address space identifier value, the physical address has a first physical address value.

3. The method of claim 2, further comprising, providing a second value to modify the at least a portion of the address space identifier, the second value based on external signals generated outside the processor, wherein:
    when the effective address has the first effective address value and the address space identifier has the first address space identifier value, the physical address has a second physical address value, different from the first physical address value.

4. The method of claim 1, wherein the first value is provided to modify the at least a portion of the address space identifier in response to a program counter matching a predetermined value.

5. The method of claim 1, wherein the first value is provided to modify the at least a portion of the address space identifier in response to receiving a signal from an external tool.

6. The method of claim 1, wherein the first value is provided to modify the at least a portion of the address space identifier in response to a predetermined real-time system event.

7. The method of claim 1, wherein providing the first value to modify the at least a portion of the address space identifier comprises modifying all of the address space identifier using the first value.

8. The method of claim 1, wherein the first value is received via a terminal of an integrated circuit comprising the processor.

9. The method of claim 1, wherein the using the effective address and the modified address space identifier to form the logical address comprises:
    concatenating the modified address space identifier with the effective address to form the logical address.

10. A method for translating logical addresses into physical addresses in a processor having an address translation table, comprising:
    providing an effective address;
    providing an address space identifier which identifies a currently executing process, the address space identifier provided by a storage location programmable by software executing on the processor;
    providing a mapping modifier to modify at least a portion of the address space identifier to form a modified address space identifier, the mapping modifier based on at least one external signal generated outside the processor;
    using the effective address and the modified address space identifier to form a logical address; and
    matching the logical address to an entry of the address translation table to provide a physical address corresponding to the logical address,
    wherein:
        when the effective address has a first effective address value, the address space identifier has a first address space identifier value, and the mapping modifier has a first mapping value, the physical address has a first physical address value, and
        when the effective address has the first effective address value, the address space identifier has the first address space identifier value, and the mapping modifier has a second mapping value, the physical address has a second physical address value, different from the first physical address value.

11. The method of claim 10, wherein the mapping modifier is provided to modify the at least a portion of the address space identifier in response to a program counter of the processor matching a predetermined value.

12. The method of claim 10, wherein the mapping modifier is provided to modify the at least a portion of the address space identifier in response to receiving a signal from an external tool.

13. The method of claim 10, wherein the mapping modifier is provided to modify the at least a portion of the address space identifier in response to a predetermined real-time system event.

14. The method of claim 10, further comprising:
    providing a processor synchronization control signal to synchronize a pipeline of the processor when the mapping modifier is used to modify the address spaced identifier.

15. The method of claim 10, wherein the mapping modifier is received via a terminal of an integrated circuit comprising the processor.

16. The method of claim 10, wherein the using the effective address and the modified address space identifier to form the logical address comprises:
    concatenating the modified address space identifier with the effective address to form the logical address.

17. A processor, comprising:
    an address translation table for translating logical addresses into physical addresses;
    storage circuitry programmable by software executed by the processor, the storage circuitry storing an address space identifier which identifies a currently executing process; and control circuitry coupled to the storage circuitry and the address translation table and coupled to receive an effective address and at least one external signal generated outside the processor, the control circuitry modifying the address space identifier using at least one external signal to produce a modified address space identifier and providing a logical address formed using the modified address space identifier and the effective address to the address translation table.

18. The processor of claim 17, wherein the address translation table comprises:
   a first entry having a first tag value based on a first effective address value, a first address space identifier value, and a first value of the at least one external signal, the first tag value corresponding to a first physical address value; and
   a second entry having a second tag value based on the first effective address value, the first address space identifier value, and a second value of the at least one external signal, the second tag value corresponding to a second logical address value, different from the first physical address value.

19. The processor of claim 17, wherein the control circuitry comprises:
   activation control circuitry coupled to receive the at least one external signal and to provide a mapping modifier based on the at least one external signal; and
   combiner circuitry coupled to the activation control circuitry, the combiner circuitry modifying the address space identifier using the mapping modifier to produce a modified address space identifier and providing the logical address formed using the modified address space identifier and the effective address to the address translation table.

20. The processor of claim 17 wherein the control circuitry modifies the address space identifier in response to at least one trigger selected from a group consisting of:
   a program counter of the processor matching a predetermined address value;
   a predetermined real-time system event; and
   receiving a signal from a tool external to the processor.

* * * * *